March 27, 1951     C. K. BILLINGS     2,546,718
MILK COOLER
Filed Oct. 15, 1949
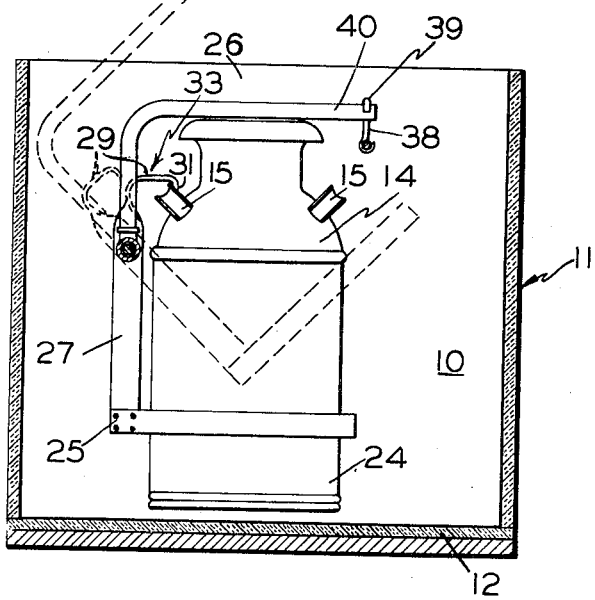
FIG. 2.
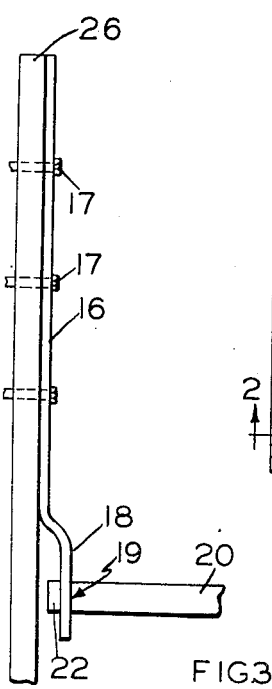
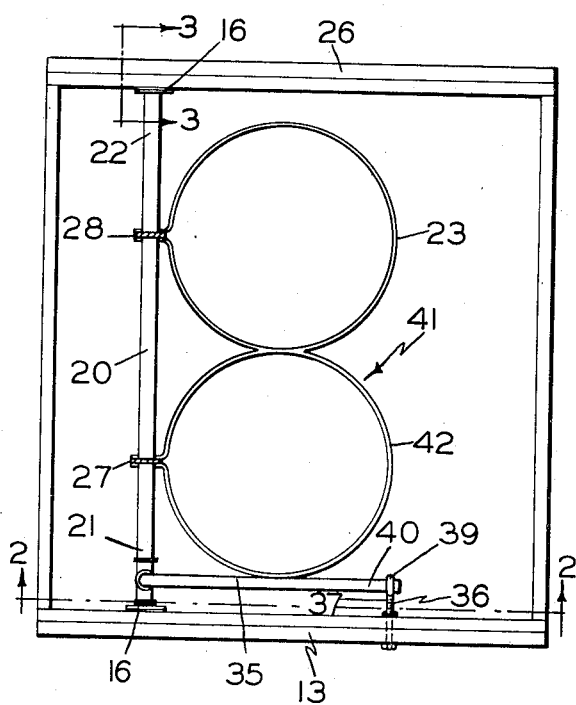
FIG. 1.
FIG. 3.
INVENTOR
CHARLES K. BILLINGS
Paul O. Pippel
ATT'Y Patented Mar. 27, 1951

2,546,718

UNITED STATES PATENT OFFICE 2,546,718

MILK COOLER

Charles K. Billings, Evansville, Ind., assignor to International Harvester Company, a corporation of New Jersey Application October 15, 1949, Serial No. 121,559

6 Claims. (Cl. 134—105)

This invention relates to milk coolers and more specifically to a new and improved device for maintaining a plurality of milk cans or the like submerged and upright within a liquid-filled receptacle.

Of recent date modern dairy farmers are employing a new system or method for milking, cooling and storing milk. The new system is generally referred to as a "pipe line milker" which, briefly stated, is a system for simultaneously milking a cow or other domestic animal and cooling and storing the milk. Milk is caused to be discharged in a milk can directly from the cow, the milk can being positioned in a milk cooler. The equipment utilized in the system includes a milk cooler of the type filled with a cooling liquid, generally water, which is maintained at a predetermined temperature by suitable refrigerating means. Inasmuch as the milk cans are positioned within the water-filled milk cooler in order to better remove the animal body heat and odor from the milk as soon as possible after leaving the cow and since they are usually empty before the milking operation is begun, difficulty is encountered by the farmer because of the buoyant effect of the cooling liquid acting upon the cans. The buoyant force of the water tends to float the cans and many times tilts the cans over. It is therefore one of the primary objectives of this invention to provide a new and improved device for maintaining the milk cans substantially submerged and upright within the milk cooler even though they may be empty.

Another object is the provision of a holding device which prevents the milk cans from tipping and rotating within the milk cooler.

Still another object is the provision of a holding device which leaves the tops of the milk cans entirely unobstructed so that the can filling heads for the pipe line milkers can be attached or a conventional funnel strainer used.

A still further object is the provision of a pivotally mounted frame which is capable of receiving a plurality of milk cans in one position and to be rocked to a second position wherein they are retained in an upright submerged condition.

The foregoing objects and other important objects and desirable features inherent in and encompassed by the invention together with many of the purposes and uses thereof will become readily apparent from a reading of the ensuing description in conjunction with the annexed drawings in which:

Fig. 1 is a plan view of the invention with the retainer hooks removed in order to better show the connection of the frame to the rod.

Fig. 2 is a side elevational view taken substantially on line 2—2 of Fig. 1 with the milk cans positioned within the milk cooler.

Fig. 3 is a detail view of one of the brackets for supporting a rod taken substantially along line 3—3 of Fig. 1.

Referring to the drawings in which like reference characters represent like elements throughout the various views, there is shown a milk cooler designated generally by numeral 10. The milk cooler 10 comprises a liquid-filled receptacle 11 having an insulated bottom wall 12 and a pair of vertically extending insulated side walls 13, 26. The receptacle is designed to be filled with a liquid, generally water, for cooling the contents of a plurality of milk cans 14 (only one of which is shown) positioned within the receptacle. The water is maintained at a predetermined temperature by conventional refrigerating apparatus or other means (not shown) and therefore is not described in detail herein. The level of the water within the receptacle is maintained as shown in Fig. 2 at a height to permit access to the interior of the cans without allowing the cooling water to enter. The milk cans 14 are of a conventional type used to ship or store bulk milk and have a pair of diametrically disposed outwardly projecting handles 15.

With the advent of the "pipe line milker" system wherein milk is caused to flow to the milk cooler directly from the cow it will be apparent that the milk cans within the water-filled receptacle must be maintained in a substantially submerged position even though empty in order to best remove the animal heat. It is equally apparent that the milk cans must be retained in a vertical upstanding or upright position during the filling operation to prevent the cans from spilling their contents by toppling over or allowing water to seep in the milk cans, thus causing contamination. The invention to be described herein is particularly concerned with providing a device in combination with a milk cooler for effectively performing these objectives.

Attached to each side wall 13, 26 there is a downwardly depending bracket 16 suitably secured to the side walls as by bolts 17 or the like. Each bracket 16 has an inwardly projecting offset portion 18 provided with a circular aperture 19. A transversely extending horizontally disposed rod 20 has its ends 21, 22 positioned in the apertures 19 and is thus rotatably supported by the brackets 16.

A frame positioned within the receptacle 11 designated by numeral 41 includes a pair of hoop-shaped metallic bands 42, 23 of a diameter to loosely receive the bottom portion 24 of a conventional milk can 14. The hoop-shaped members 42, 23 are secured to lower portions 25, one of which is shown, of a pair of narrow, flat, generally upright members 27, 28, which upright members are welded or otherwise fastened to the rod 20 as shown in Fig. 1. The ends of upright members 27, 28 opposite ends 25 are bent to form horizontally projecting portions 29 which in turn have their ends 31 curved slightly downwardly to complete retainer hook-shaped members 33. It will be appreciated from the foregoing structure that the frame 41, the rod 20, and the retainer hook-shaped members 33 can be rocked or rotated together as a unit with respect to the receptacle 11. Rigidly attached adjacent one end 21 of the rod 20 is a lever 35. The lever 35 may be conveniently grasped by the hand of the farmer to rock the frame 41 from a can receiving position shown in dotted lines in Fig. 2 to a can submerged position. Projecting inwardly from side wall 13 is a pin 36 having a threaded portion 37 rigidly held on the side wall by any suitable means. A hook member 38 is pivotally mounted on the pin 36 and is adapted to swing to a substantially vertical position whereby an arcuate portion 39 of the hook member 38 will abut the upper surface of one end 40 of the lever 35 when the lever 35 is in its can submerged position as shown in Fig. 2.

In operation, the frame 41 is rocked to a can receiving position as shown in dotted lines in Fig. 2. Two empty milk cans are then positioned within the hoop-members 42, 23. The cans are forced downwardly against the buoyant force of the water within the receptacle 11 until one of the handles 15 of each can is positioned beneath a hook-shaped member 33. The cans when released by the farmer are held in the frame and prevented from floating to the surface of the water by the hook-shaped members 33 and the hoop members 42, 23. The frame 41 may then be rocked to the can submerged position wherein the milk cans 14 are substantially submerged and in an upright position. When the frame 41 is in this position one end 40 of the lever 35 is engaged by swinging hook member 38 so that the arcuate portion 39 is positioned above the lever. It will be appreciated that the cans are effectively prevented from rising to the surface of the water and toppling over by the above described structure.

The embodiment of the invention chosen for the purpose of illustration and description herein is that preferred as a result of selective tests based upon requirements for achieving the objects of the invention and developing utility thereof in the most desirable manner. It will be appreciated therefore that the particular structural and functional features emphasized herein are not intended to exclude but rather to suggest other adaptations and modifications of the invention as fall within the spirit and scope of the invention as defined in the appended claims.

What is claimed is:

1. In combination with a liquid-filled receptacle and a can, a frame pivotally supported on said receptacle adapted to receive said can, said frame including a hoop-shaped band adapted to encompass a bottom portion of said can to position said can with respect to said frame; means to rock said frame from a first position wherein said can may be placed within said frame to a second position wherein said can is substantially immersed in the liquid, said means including a lever rockable with said frame; and lever engaging means to lock said frame in said second position, said means including a hook-shaped member mounted on said receptacle adapted to hook over said lever.

2. In combination with a liquid-filled receptacle and a can, a frame pivotally supported on said receptacle adapted to receive said can, said frame including a hoop-shaped metallic band adapted to encompass a bottom portion of said can to position said can with respect to said frame; means to rock said frame from a first position wherein said can may be readily placed in said frame to a second position wherein said can is immersed in the liquid, said means including a lever rockable with said frame; and means cooperable with said lever to maintain said frame in said second position.

3. In a milk cooler of the type having a water-filled receptacle adapted to receive a milk can, the combination comprising a frame adapted to receive a milk can, said frame including a hoop-shaped metallic band adapted to encompass a bottom portion of the milk can; means for pivotally supporting said frame on said receptacle whereby said frame may be rocked from a first position wherein said milk can may be readily inserted in said frame to a second position wherein said milk can is immersed in the water; means carried by the frame for retaining said milk can in a substantially submerged condition against the buoyant effect of the water when the can is empty upon rocking said frame to said second position, said means including a hook-shaped member carried by said frame engageable with an upper portion of said milk can.

4. In a milk cooler of the type having a water-filled receptacle adapted to receive a plurality of milk cans, the combinaton comprising a frame adapted to receive a plurality of milk cans; means for pivotally mounting said frame on said receptacle whereby said frame may be rocked to a can-submerged position; means carried by the frame for retaining said milk cans in a substantially submerged condition against the buoyant effect of the water when the cans are empty upon rocking said frame to said can-submerged position; means for rocking said frame to said can-submerged position; and means for maintaining said frame in said can-submerged position.

5. In a milk cooler of the type having a water-filled receptacle adapted to receive a plurality of milk cans, the combination comprising a frame adapted to receive a plurality of milk cans, said frame including a plurality of milk cans, said frame including a plurality of hoop-shaped metallic bands, each adapted to encompass a bottom portion of a single can; means for pivotally mounting said frame on said receptacle whereby said frame may be rocked to a can-submerged position; means carried by the frame for retaining said milk cans in a substantially submerged condition against the buoyant effect of the water when the cans are empty upon rocking said frame to said can-submerged position, said means including a plurality of hook-shaped members engageable with a portion of the milk cans; means for rocking the frame to said can-submerged position, said means including a lever rigidly connected with said frame; and means for maintaining said frame in said can-submerged position, said means being engageable with said lever.

6. In a milk cooler of the type having a water-filled receptacle adapted to receive a plurality of milk cans having handle portions, the combination comprising a frame adapted to receive a plurality of milk cans, said frame including a plurality of hoop-shaped metallic bands each adapted to encompass a bottom portion of a single can; means for pivotally mounting said frame on said receptacle whereby said frame may be rocked to a can-submerged position, said means including a rod rigidly connected to said frame and having its ends pivotally supported by said receptacle; means carried by the frame for retaining said milk cans in a substantially submerged condition against the buoyant effect of the water when the cans are empty upon rocking said frame to said can-submerged position, said means including a plurality of hook-shaped members engageable with the handle portion of the milk cans; means for rocking the frame to said can-submerged position, said means including a lever rigidly attached to said rod; and means for maintaining said frame in said can-submerged position comprising a hook member pivotally mounted on said receptacle adapted to engage a portion of said lever.

CHARLES K. BILLINGS.

REFERENCES CITED

The following references are of record in the file of this patent:

UNITED STATES PATENTS

| Number | Name | Date |
| --- | --- | --- |
| 1,627,080 | Fellenbaum | May 3, 1927 |
| 1,869,284 | Swanson | July 26, 1932 |
| 2,183,221 | Krug | Dec. 12, 1939 |
| 2,218,602 | Carryl | Oct. 22, 1940 |
| 2,470,979 | Duncan | May 24, 1949 |
| 2,505,885 | Davis | May 2, 1950 |